(12) United States Patent
Song et al.

(10) Patent No.: US 9,162,568 B2
(45) Date of Patent: Oct. 20, 2015

(54) DRIVE SHAFT DETECTION FOR PUMP OR MOTOR PROTECTION

(71) Applicant: Parker-Hannifin Corporation, Cleveland, OH (US)

(72) Inventors: Guobiao Song, Dublin, OH (US); Yisheng Zhang, Dublin, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/339,692

(22) Filed: Jul. 24, 2014

(65) Prior Publication Data

US 2015/0032327 A1 Jan. 29, 2015

Related U.S. Application Data

(60) Provisional application No. 61/858,229, filed on Jul. 25, 2013.

(51) Int. Cl.
| | |
|---|---|
| *G01M 17/00* | (2006.01) |
| *G06F 7/00* | (2006.01) |
| *B60K 23/00* | (2006.01) |
| *F16H 59/40* | (2006.01) |
| *G01M 13/02* | (2006.01) |
| *G01M 17/007* | (2006.01) |

(52) U.S. Cl.
CPC ............... *B60K 23/00* (2013.01); *F16H 59/40* (2013.01); *G01M 13/02* (2013.01); *G01M 17/007* (2013.01)

(58) Field of Classification Search
CPC .... B60K 23/00; G01M 17/007; G01M 13/02; F16H 59/40

USPC ......................................................... 701/33.9
See application file for complete search history.

(56) References Cited

U.S. PATENT DOCUMENTS

| | | |
|---|---|---|
| 5,608,626 A | 3/1997 | Ibamoto et al. |
| 6,293,085 B2 | 9/2001 | Thompson et al. |
| 8,140,207 B2 | 3/2012 | Nozaki et al. |

FOREIGN PATENT DOCUMENTS

FR    2914742 A1    10/2008

OTHER PUBLICATIONS

European Search report for corresponding European Application No. 14178129.4 dated Mar. 30, 2015.

*Primary Examiner* — Maceeh Anwari
(74) *Attorney, Agent, or Firm* — Renner, Otto, Boisselle & Sklar, LLP

(57) ABSTRACT

A method of operating a vehicle includes the steps of: entering a drive shaft test mode; receiving a command to position a yoke to drive the shaft; regulating the shaft speed so as to be below a predefined threshold; and determining whether a drive shaft is available based on whether an actual drive shaft speed is detected above the predefined threshold. When the detected actual drive shaft speed is above the predefined threshold, it is determined that the drive shaft is not available and the vehicle is disabled to prevent damage to the vehicle. When the detected actual drive shaft speed is not above the predefined threshold, it is determined that the drive shaft is available, and the vehicle may be operated as is typical. The methods may be performed by an controller executing program code stored on a non-transitory computer readable medium.

13 Claims, 5 Drawing Sheets

DRIVE SHAFT DETECTION FOR PUMP OR MOTOR PROTECTION

RELATED APPLICATION

This application claims the benefit of U.S. Provisional Application No. 61/858,229, filed Jul. 25, 2013, which is incorporated herein by reference.

FIELD OF INVENTION

The present invention relates generally to drive systems, controls, and diagnostics for pumps and motors, particularly as may be used in vehicle drive systems, and more particularly to methods and systems for operating a vehicle in a test mode for detecting a drive shaft.

BACKGROUND

In conventional vehicle transmission systems, the drive shaft is removed for towing when the vehicle cannot be driven to a repair shop. This presents a potential danger in that a repair or service technician can forget to reinstall the drive shaft back into the vehicle before the vehicle is driven again. If the drive shaft is not reinstalled into the vehicle, subsequent driving could cause severe damage to the vehicle power train and drive train components. In absence of the drive shaft, such vehicle components become susceptible to high rotation speeds because there is very little counteracting inertia at the power train when drive shaft is removed.

SUMMARY OF INVENTION

The present invention provides methods for operating a vehicle that reduces the likelihood of vehicle damage that may be caused by operating the vehicle without the drive shaft installed. In particular, the invention provides methods and systems for transmission control in which the availability (i.e., presence or absence) of a drive shaft is detected. The availability of the drive shaft is detected by operating the vehicle in a special test mode of operation after initial gear shifting from neutral to in-gear at the vehicle startup. If the drive shaft is not detected based on the drive shaft test mode of operation, the vehicle is disabled to protect vehicle components from damage due to uncontrolled rotation.

An aspect of the invention, therefore, is a method of operating a vehicle having a drive shaft test mode. In exemplary embodiments, the method of operating a vehicle includes the steps of: entering the drive shaft test mode; receiving a command to position a yoke to drive the shaft; regulating the shaft speed so as to be below a predefined threshold; and determining whether a drive shaft is available based on whether an actual drive shaft speed is detected above the predefined threshold. When the detected actual drive shaft speed is above the predefined threshold, it is determined that the drive shaft is not available and the vehicle is disabled to prevent damage to the vehicle. When the detected actual drive shaft speed is not above the predefined threshold, it is determined that the drive shaft is available, and the vehicle may be operated as typical.

The drive shaft test mode may be entered when it is determined that a shift event is a shift of the transmission from neutral to in-gear following the initial startup of the vehicle. For example, such a shift event may be deemed to have occurred when the shift event (a) is the first shifting, (b) occurred within the last three seconds, (c) occurred with the accelerator not pressed, and (d) occurred with the parking brake applied and the vehicle not moving. The drive shaft test mode may be exited when an exit condition is detected. For example, the exit condition may include at least one of whether the accelerator is pressed, whether the parking brake is released, whether the vehicle has shifted out of hydraulic gears, or whether the drive shaft speed already is detected above the predefined threshold.

Another aspect of the invention is a control system for operating a vehicle having a drive shaft test mode. In exemplary embodiments, the control system includes a sensor system for detecting a drive shaft speed, and a controller configured to determine whether a drive shaft is available based on whether an actual draft shaft speed detected by the sensor system is above a predefined threshold. The control system may be configured to perform the described methods by executing a computer program stored on a non-transitory computer readable medium.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
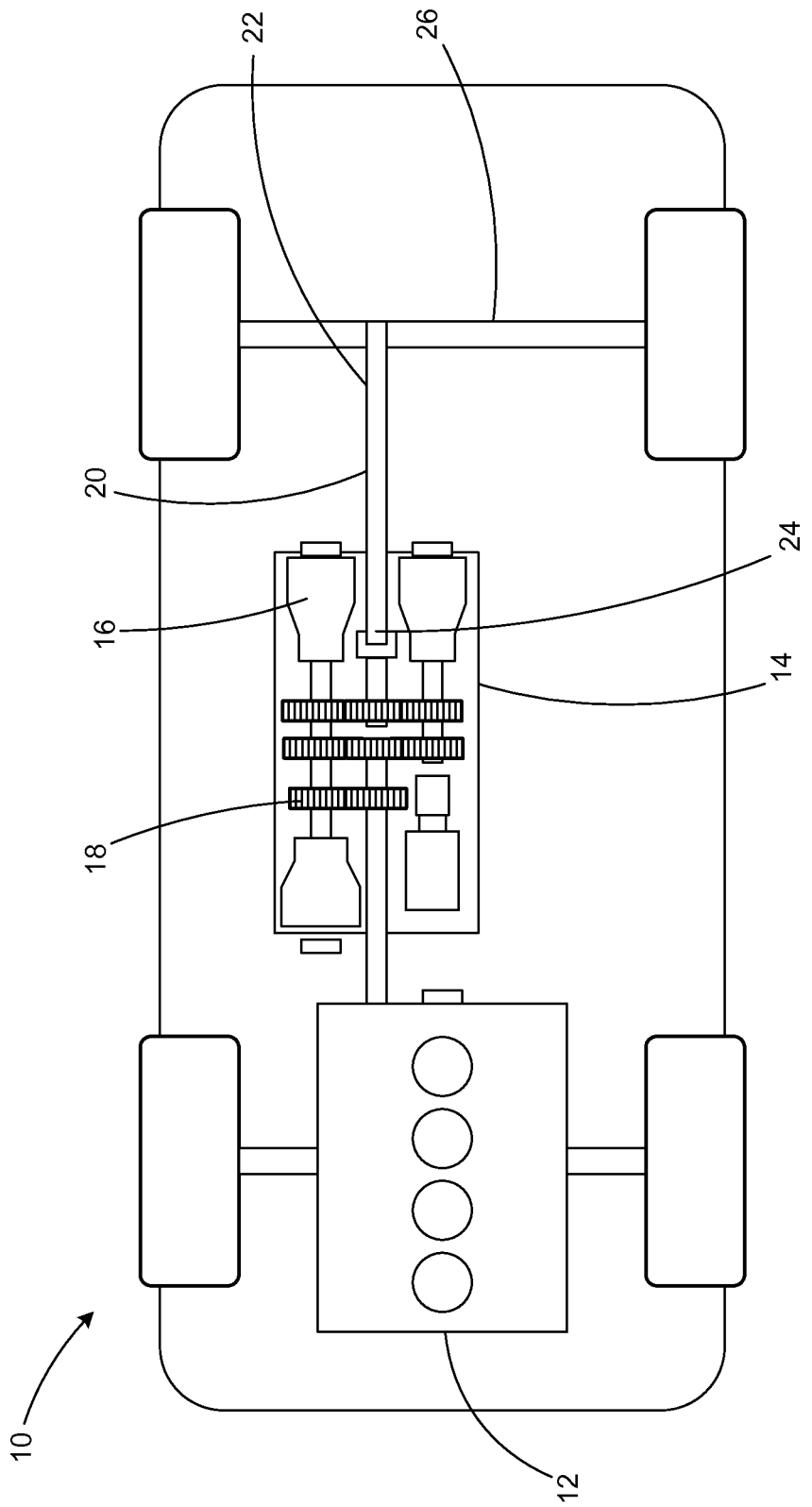
FIG. 1 is schematic diagram depicting an exemplary vehicle in accordance with embodiments of the present invention.

Embodiments of the present invention will now be described with reference to the drawings, wherein like reference numerals are used to refer to like elements throughout. It will be understood that the figures are not necessarily to scale.

FIG. 1 is schematic diagram depicting an exemplary vehicle 10. The vehicle 10 generally includes an engine 12 coupled to a power drive unit (PDU) 14. The PDU 14 includes a plurality of hydraulic pumps 16 that drive a gear train 18 in accordance with the gear selected via the vehicle transmission system. The gear train 18 drives a drive shaft 20 in response to a yoke position command, which in turn causes the wheel axle 26 and associated wheels to turn.

The drive shaft 20 includes a first segment 22 adjacent the wheel axle 26, and a second smaller segment 24 substantially contained within the PDU 14. For towing, the first segment of the drive shaft 22 may be removed (which also is referred to herein more generally as removal of the drive shaft), leaving only the smaller second segment remaining within the PDU 14.

As referenced above, if the drive shaft is not reinstalled into the vehicle, subsequent driving could cause severe damage to the vehicle power train and drive train components. In absence of the drive shaft, such vehicle components become susceptible to high rotation speeds because there is very little counteracting inertia at the power train when drive shaft is removed. The present invention, therefore, provides methods and systems for transmission control in which the availability (i.e., presence or absence) of a drive shaft is detected. The availability of the drive shaft is detected by operating the vehicle in a special test mode of operation after initial gear shifting from neutral to in-gear at the vehicle startup. If the drive shaft is not detected based on the drive shaft test mode of operation, the vehicle is disabled to protect vehicle components from damage due to uncontrolled rotation.

Figure 2:
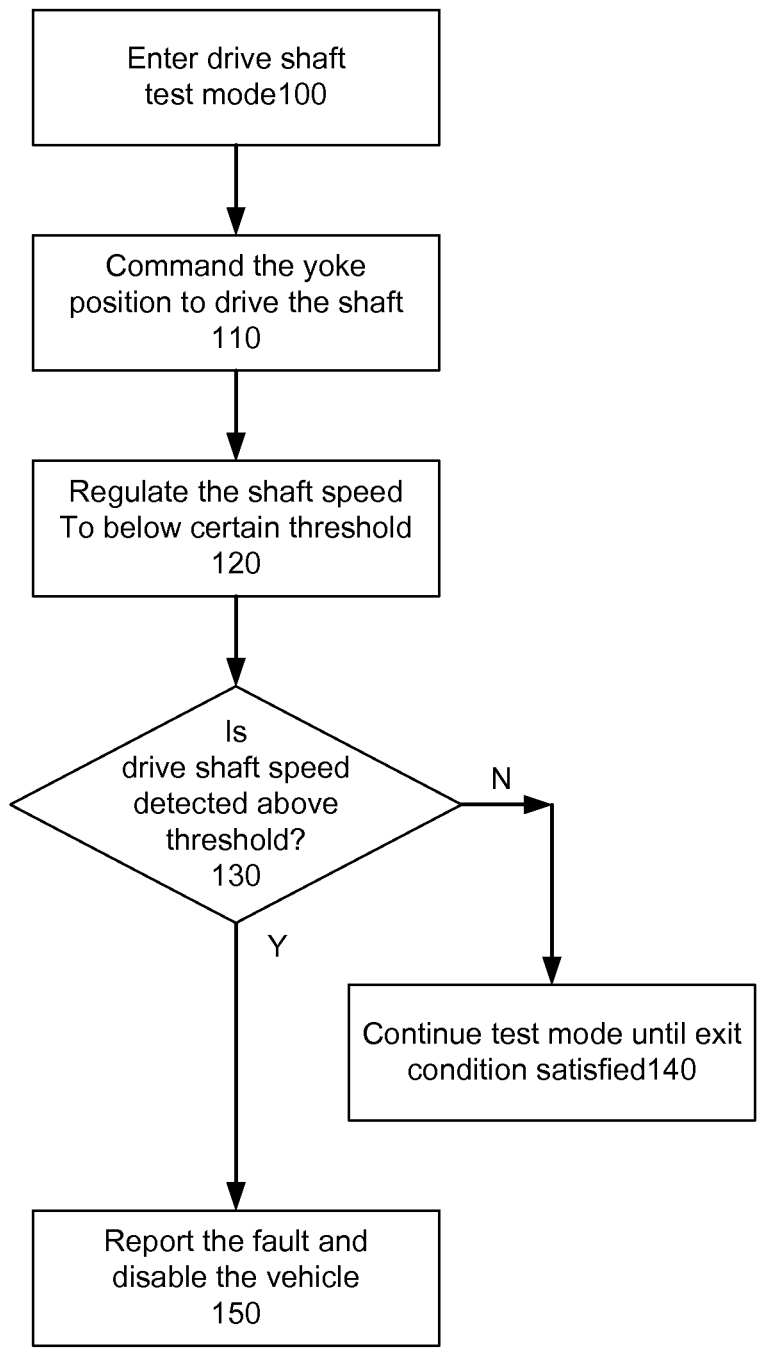
FIG. 2 is a flow chart diagram depicting an exemplary method of operating a vehicle in a drive shaft test mode.

FIG. 2 is a flow chart diagram depicting an exemplary method of operating a vehicle in a drive shaft test mode. At step 100, the drive shaft test mode is entered. At step 110, a command is received to position the yoke to drive the shaft. Such command, for example, is received when the driver would attempt to shift the transmission from neutral to in-gear following the initial startup of the vehicle. At step 120, in response to the yoke command, an artificial torque command is generated to regulate the shaft speed so as to be below a certain or predefined threshold.

As referenced above, however, if the drive shaft is not available (particularly by removal of the first segment of the drive shaft referenced above), the vehicle components, particularly of the power train or drive train, would tend to rotate above the speed commensurate with the intended drive shaft speed. Accordingly, at step 130 a determination is made as to whether the actual drive shaft speed is detected above the predefined threshold. In particular, the speed of the second segment 24 of the drive shaft remaining in the PDU 14 may be detected as the actual drive shaft speed. With the removal of the first segment of the drive shaft, the rotation of the second segment is not limited and the second segment would tend to rotate well above the predefined threshold.

If a "No" determination is made at step 130, i.e., the detected speed indeed is not above the predefined threshold, it is deemed that the drive shaft is present and preventing the second segment from rotating. The method therefore proceeds to step 140 and continues the test mode until an exit condition is satisfied. If, however, a "Yes" determination is made at step 130, i.e., the detected speed is above the predefined threshold, it is deemed that the drive shaft is not present and available. The method therefore proceeds to step 150, at which point the vehicle is disabled. The vehicle is disabled so as to prevent damage to vehicle components by driving in the absence of the entire drive shaft. A fault message or indication also may be provided to alert the vehicle operator that the drive shaft is absent and unavailable.

Figure 3:
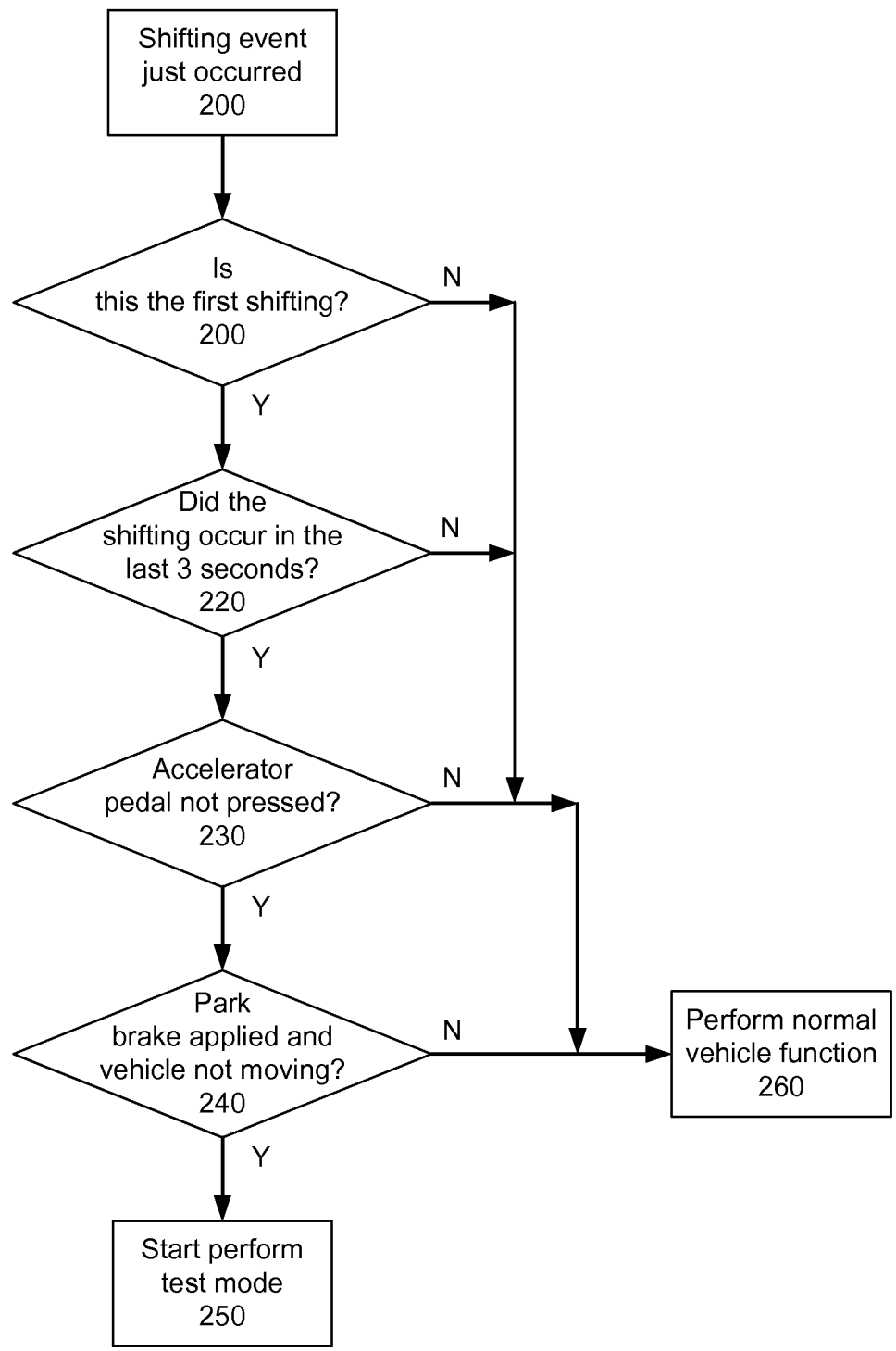
FIG. 3 is a flow chart diagram depicting an exemplary method of entering the drive shaft test mode of operation of FIG. 1.

FIG. 3 is a flow chart diagram depicting an exemplary method of entering the drive shaft test mode operation of FIG. 2. Generally, the drive shaft test mode of operation should be entered when the vehicle operator attempts to shift the transmission from neutral to in-gear following the initial startup of the vehicle. Accordingly, at step 200 a shift event occurs. Steps 210-240 essentially are indicative of whether such shift event indeed is a shift of the transmission from neutral to in-gear following the initial startup of the vehicle. The method, therefore, detects whether the shift event is the first shifting (step 200), occurred within the last three seconds (step 220), occurred with the accelerator not pressed (step 230), and occurred with the parking brake applied and the vehicle not moving (step 240).

A "No" determination in any of steps 210-240 would tend to be indicative that the drive shaft test mode should not be initiated. In such case, the method proceeds to step 260 and normal vehicle function proceeds. A "Yes" determination in all of steps 210-240, however, would tend to be indicative that the shift event that occurs at step 200 is indeed a shift of the transmission from neutral to in-gear following the initial startup of the vehicle, and the vehicle is in safe conditions to allow drive shaft detection mode. In such case, the method proceeds to step 250 and the drive shaft test mode of operation is entered.

Figure 4:
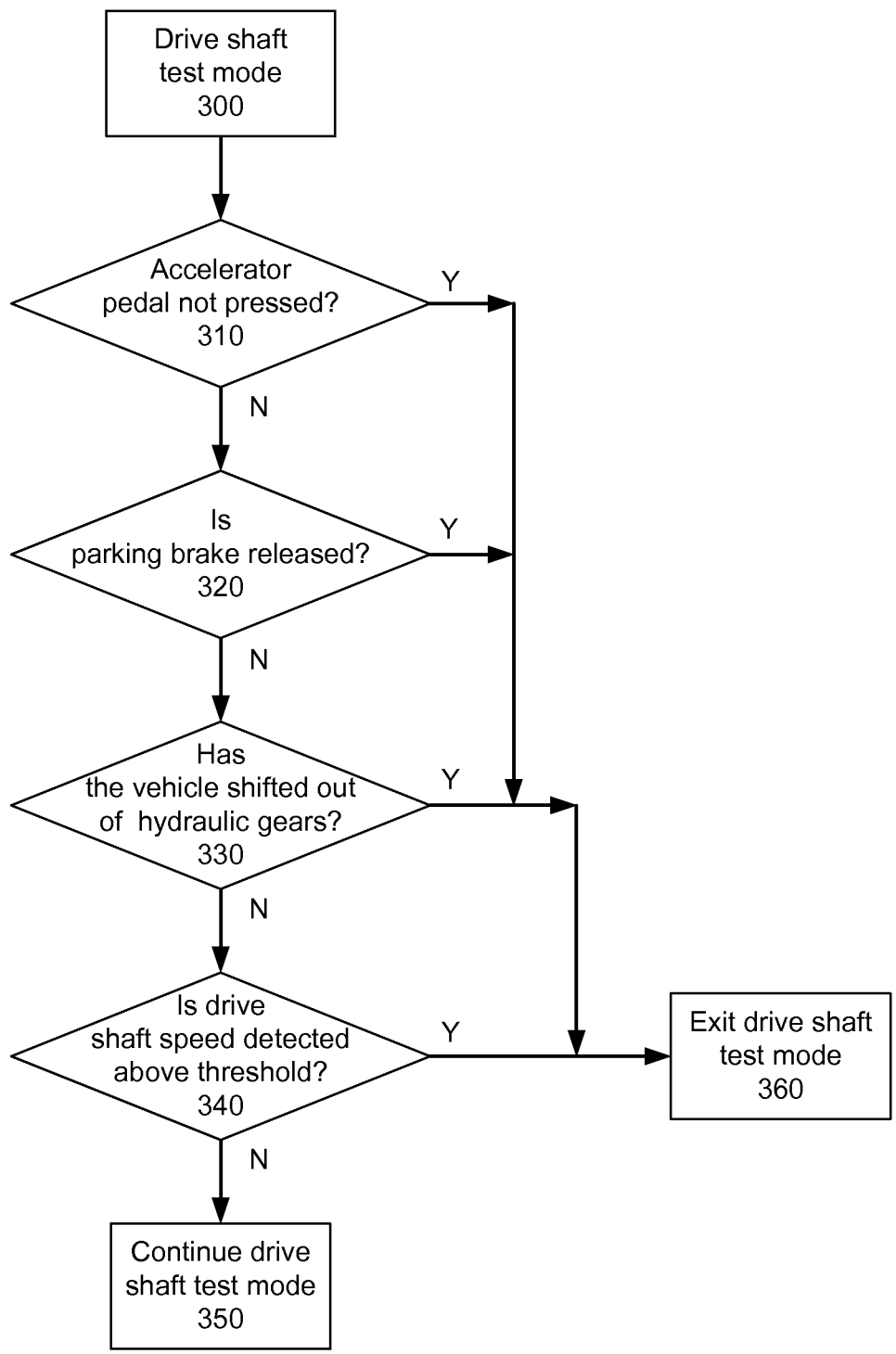
FIG. 4 is a flow chart diagram depicting an exemplary method of exiting the drive shaft test mode of operation of FIG. 1.

FIG. 4 is a flow chart diagram depicting an exemplary method of exiting the drive shaft test mode of operation of FIG. 2, as indicated at step 140. Generally, the drive shaft test mode of operation may be exited by driver action so the vehicle may be operated immediately when the drive shaft test mode otherwise would be performed. Accordingly, at step 300 it is presumed that the vehicle already is within the drive shaft test mode of operation. Steps 310-340 collectively constitute a step of detecting whether one or more exit conditions is present for exiting the drive shaft test mode. The method, therefore, detects whether the accelerator is pressed (step 310), whether the parking brake is released (step 320), whether the vehicle has shifted out of hydraulic gears (step 330), and/or whether the drive shaft speed already is detected above the predefined threshold (340). This last exit condition essentially provides an indication that the drive shaft is not present so the driver may be alerted, upon which the test mode is complete and may be exited.

A "Yes" determination in any of steps 310-340 would tend to be indicative that the driver wishes to exit the test mode while the drive shaft test mode otherwise would be performed. In such case, the method proceeds to step 360 and the drive shaft test mode is exited. A "No" determination in all of steps 310-340, however, results in the method proceeding to step 350, and the drive shaft test mode is continued in accordance with FIG. 2.

Figure 5:
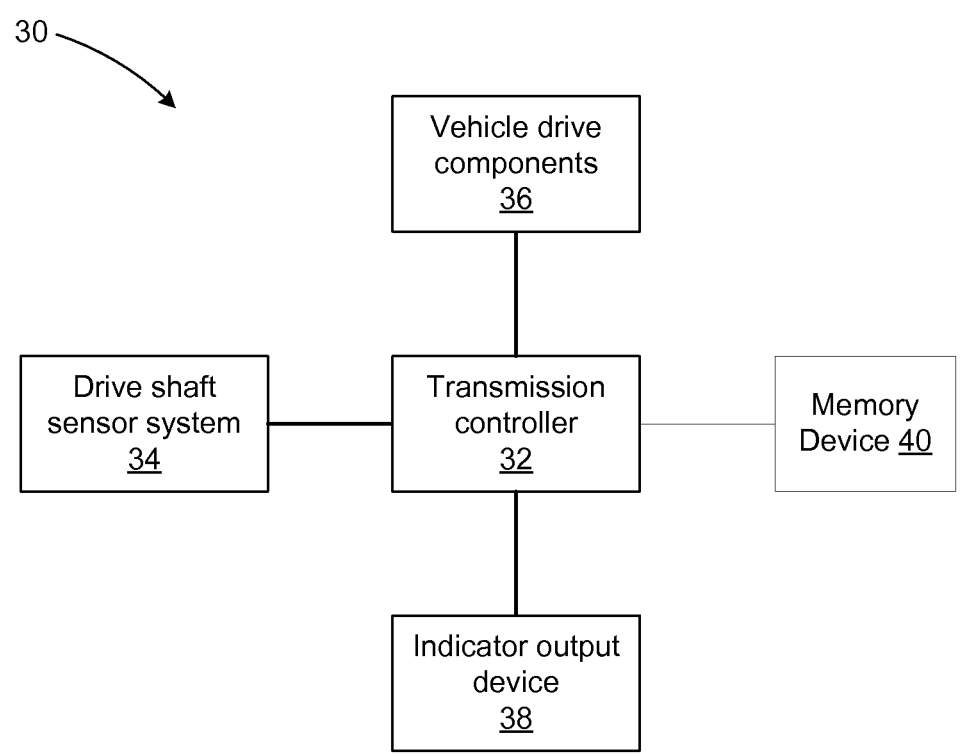
FIG. 5 is a block diagram depicting operative components of a control system for performing the methods of FIGS. 2-4.

FIG. 5 is a block diagram depicting operative components of a control system 30 for performing the methods of FIGS. 2-4. The control system 30 may include a controller 32 configured to control the various operations of the components of the system 30. The controller 32 may be configured as a processor device, microprocessor, control circuit or the like device as are known in the art. The controller further may be connected to a memory device 40. Although represented as a single memory device, the memory device 40 may include one or more memory devices configured as non-transitory comparable computer readable media as are known in the art for storing executable computer program code. The controller 32 may execute the program code to perform the method steps of the operations of FIGS. 2-4 to cause the described methods to be carried out. In exemplary embodiments, the controller is the transmission controller for the transmission system.

A sensor system 34 may provide sensory inputs to the controller 32. In particular, the sensor system 34 may include sensor devices for detecting whether or not the drive shaft speed is above the predefined threshold as part of the drive shaft test mode of operation described above with respect to FIG. 2. The sensor system may further detect the operational conditions by which the controller would cause the system to enter and exit the drive shaft test mode of operation as described with respect to FIGS. 3 and 4. In exemplary embodiments, the sensor system 34 is the same sensor system that provides feedback control of the drive shaft speed during normal vehicle operation.

Commensurate with the drive shaft testing mode, the controller is configured to determine whether the detected shaft speed is above the predefined threshold, and if so, it is deemed that the drive shaft is not present and available. As referenced above, the vehicle then may be disabled. For example, the controller may send one or more signals to any one or more of appropriate vehicle drive components 36 (e.g., transmission, engine, PDU, etc) to disable the vehicle. The controller also may generate a fault indicator to be outputted to an indicator output device 38, which alerts the vehicle operator that the drive shaft is absent and unavailable, and the vehicle is disabled. The indicator output device may a display to display the fault message, a dashboard light or warning indicator, an audio device to provide an audio alert, and/or like devices or combinations thereof.

An aspect of the invention, therefore, is a method of operating a vehicle having a drive shaft test mode. In exemplary embodiments, the method of operating a vehicle includes the steps of: entering the drive shaft test mode; receiving a command to position a yoke to drive the shaft; regulating the shaft speed so as to be below a predefined threshold; and determining whether a drive shaft is available based on whether an actual drive shaft speed is detected above the predefined threshold.

In an exemplary embodiment of the method of operating a vehicle, when the detected actual drive shaft speed is above the predefined threshold, the method further includes determining that the drive shaft is not available.

In an exemplary embodiment of the method of operating a vehicle, the method further includes disabling the vehicle when it is determined that the drive shaft is not available.

In an exemplary embodiment of the method of operating a vehicle, the method further includes generating a fault message that alerts a vehicle operator that the drive shaft is not available.

In an exemplary embodiment of the method of operating a vehicle, when the detected actual drive shaft speed is not above the predefined threshold, the method further includes determining that the drive shaft is available and operating the vehicle with the drive shaft limiting the speed.

In an exemplary embodiment of the method of operating a vehicle, the step of entering the drive shaft test mode includes the steps of: detecting a shift event of a vehicle transmission; determining whether the shift event is a shift from neutral to in-gear following initial startup of the vehicle; and when it is determined that the shift event is a shift of the transmission from neutral to in-gear following the initial startup of the vehicle, entering the drive shaft test mode.

In an exemplary embodiment of the method of operating a vehicle, the step of determining whether the shift event is a shift from neutral to in-gear following the initial startup of the vehicle includes the steps of: detecting conditions of whether the shift event (a) is the first shifting, (b) occurred within the last three seconds, (c) occurred with the accelerator not pressed, and (d) occurred with the parking brake applied and the vehicle not moving; and determining that the shift event is a shift from neutral to in-gear following the initial startup of the vehicle when all of conditions (a)-(d) are satisfied.

In an exemplary embodiment of the method of operating a vehicle, the method further includes, after the step of entering the drive shaft test mode, the steps of: detecting whether an exit condition is present; and exiting the drive shaft test mode when the exit condition is present.

In an exemplary embodiment of the method of operating a vehicle, the exit condition comprises at least one of whether the accelerator is pressed, whether the parking brake is released, whether the vehicle has shifted out of hydraulic gears, or whether the drive shaft speed already is detected above the predefined threshold.

Another aspect of the invention includes a control system for operating a vehicle having a drive shaft test mode. In exemplary embodiments, the control system includes a sensor system for detecting a drive shaft speed, and a controller configured to determine whether a drive shaft is available based on whether an actual draft shaft speed detected by the sensor system is above a predefined threshold.

In an exemplary embodiment of the control system, when the detected actual draft shaft speed is above the predefined threshold, the controller determines that the drive shaft is not available.

In an exemplary embodiment of the control system, the control system further includes one or vehicle components that when disabled, disable a vehicle, wherein when the controller determines that that the drive shaft is not available, the controller causes one or more of said vehicle components to disable the vehicle.

In an exemplary embodiment of the control system, the control system further includes an indicator output device, wherein when the controller determines that that the drive shaft is not available, the controller causes the indicator output device to generate a fault message that alerts a vehicle operator that the drive shaft is not available.

Another aspect of the invention is a non-transitory computer readable medium storing executable program code. In exemplary embodiments, when executed by a controller the program is configured to perform the steps of: entering the drive shaft test mode; receiving a command to position a yoke to drive the shaft; regulating the shaft speed so as to be below a predefined threshold; and determining whether a drive shaft is available based on whether an actual drive shaft speed is detected above the predefined threshold.

In an exemplary embodiment of the non-transitory computer readable medium, when the detected actual drive shaft speed is above the predefined threshold, the program code is executed to determine that the drive shaft is not available.

In an exemplary embodiment of the non-transitory computer readable medium, the program code is executed further to disable the vehicle when it is determined that the drive shaft is not available.

In an exemplary embodiment of the non-transitory computer readable medium, when the detected actual drive shaft speed is not above the predefined threshold, the program code is executed to determine that the drive shaft is available such that the vehicle is operable with the drive shaft limiting the speed.

In an exemplary embodiment of the non-transitory computer readable medium, the step of entering the drive shaft test mode includes executing the program code to perform the steps of: detecting a shift event of a vehicle transmission; determining whether the shift event is a shift from neutral to in-gear following initial startup of the vehicle; and when it is determined that the shift event is a shift of the transmission from neutral to in-gear following the initial startup of the vehicle, entering the drive shaft test mode.

In an exemplary embodiment of the non-transitory computer readable medium, after the step of entering the drive shaft test mode, the program code is executed to perform the steps of: detecting whether an exit condition is present; and exiting the drive shaft test mode when the exit condition is present.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of operating a vehicle having a drive shaft test mode comprising the steps of:
    entering the drive shaft test mode;
    receiving a command to position a yoke to drive the shaft;
    regulating the shaft speed so as to be below a predefined threshold; and
    determining whether a drive shaft is available based on whether an actual drive shaft speed is detected above the predefined threshold wherein when the detected actual drive shaft speed is above the predefined threshold, determining that the drive shaft is not available; further comprising disabling the vehicle when it is determined that the drive shaft is not available.

2. The method of operating a vehicle of claim 1, further comprising generating a fault message that alerts a vehicle operator that the drive shaft is not available.

3. The method of operating a vehicle of claim 2, wherein when the detected actual drive shaft speed is not above the predefined threshold, determining that the drive shaft is available and operating the vehicle with the drive shaft limiting the speed.

4. The method of operating a vehicle of claim 1, wherein the step of entering the drive shaft test mode comprises the steps of:
    detecting a shift event of a vehicle transmission;
    determining whether the shift event is a shift from neutral to in-gear following initial startup of the vehicle; and
    when it is determined that the shift event is a shift of the transmission from neutral to in-gear following the initial startup of the vehicle, entering the drive shaft test mode.

5. The method of operating a vehicle of claim 4, wherein the step of determining whether the shift event is a shift from neutral to in-gear following the initial startup of the vehicle comprises the steps of:
    detecting conditions of whether the shift event (a) is the first shifting, (b) occurred within the last three seconds, (c) occurred with the accelerator not pressed, and (d) occurred with the parking brake applied and the vehicle not moving; and
    determining that the shift event is a shift from neutral to in-gear following the initial startup of the vehicle when all of conditions (a)-(d) are satisfied.

6. The method of operating a vehicle of claim 1, further comprising, after the step of entering the drive shaft test mode, the steps of:
    detecting whether an exit condition is present; and
    exiting the drive shaft test mode when the exit condition is present.

7. The method of operating a vehicle of claim 6, wherein the exit condition comprises at least one of whether the accelerator is pressed, whether the parking brake is released, whether the vehicle has shifted out of hydraulic gears, or whether the drive shaft speed already is detected above the predefined threshold.

8. A control system for operating a vehicle having a drive shaft test mode comprising:
    a sensor system for detecting a drive shaft speed; and
    a controller configured to determine whether a drive shaft is available based on whether an actual draft shaft speed detected by the sensor system is above a predefined threshold wherein when the detected actual drive shaft speed is above the predefined threshold, the controller determines that the drive shaft is not available; further comprising one or more vehicle components that when disabled, disable a vehicle; wherein when the controller determines that the drive shaft is not available, the controller causes one or more of said vehicle components to disable the vehicle.

9. The control system of claim 8, further comprising an indicator output device;
    wherein when the controller determines that that the drive shaft is not available, the controller causes the indicator output device to generate a fault message that alerts a vehicle operator that the drive shaft is not available.

10. A non-transitory computer readable medium storing executable program code, which when executed by a controller is configured to perform the steps of:
    entering the drive shaft test mode;
    receiving a command to position a yoke to drive the shaft;
    regulating the shaft speed so as to be below a predefined threshold; and
    determining whether a drive shaft is available based on whether an actual drive shaft speed is detected above the predefined threshold wherein when the detected actual drive shaft speed is above the predefined threshold, the program code is executed to determine that the drive shaft is not available; wherein the program code is executed further to disable the vehicle when it is determined that the drive shaft is not available.

11. The non-transitory computer readable medium of claim 10, wherein when the detected actual drive shaft speed is not above the predefined threshold, the program code is executed to determine that the drive shaft is available such that the vehicle is operable with the drive shaft limiting the speed.

12. The non-transitory computer readable medium of claim 10, wherein the step of entering the drive shaft test mode comprises executing the program code to perform the steps of:
    detecting a shift event of a vehicle transmission;
    determining whether the shift event is a shift from neutral to in-gear following initial startup of the vehicle; and
    when it is determined that the shift event is a shift of the transmission from neutral to in-gear following the initial startup of the vehicle, entering the drive shaft test mode.

13. The non-transitory computer readable medium of claim 10, further comprising, after the step of entering the drive shaft test mode, the program code is executed to perform the steps of:
    detecting whether an exit condition is present; and
    exiting the drive shaft test mode when the exit condition is present.

* * * * *